United States Patent [19]

Hwang

[11] Patent Number: 4,942,806

[45] Date of Patent: Jul. 24, 1990

[54] VEHICULAR INTERNAL AIR EXHAUSTING DEVICE

[75] Inventor: Feng-Lin Hwang, Keelung City, Taiwan

[73] Assignee: Tech Zeal Industrial C., Ltd., Taiwan, Taiwan

[21] Appl. No.: 383,480

[22] Filed: Jul. 24, 1989

[51] Int. Cl.⁵ .............................................. B60H 1/26
[52] U.S. Cl. ...................................... 98/2.02; 98/2.18; 98/900
[58] Field of Search ........................ 98/2.02, 2.18, 900

[56] References Cited

U.S. PATENT DOCUMENTS

| 2,853,932 | 9/1958 | Fredl | 98/2.18 |
| 4,741,256 | 5/1988 | Huang | 98/2.18 X |
| 4,804,140 | 2/1989 | Cantrell | 98/2.18 |

FOREIGN PATENT DOCUMENTS

| 2534639 | 4/1984 | France | 98/900 |
| 54-45047 | 4/1979 | Japan | 98/2.02 |
| 57-11105 | 1/1982 | Japan | 98/2.18 |

Primary Examiner—Harold Joyce
Attorney, Agent, or Firm—Browdy and Neimark

[57] ABSTRACT

A vehicular internal air exhausting device being accomplished by an air exhausting assembly and a power source supply assembly. The air exhausting assembly is mounted on the trunk compartment top plate behind the rear seat or any other suitable place of a vehicle, comprising of a bottom plate which unites all relative components and is positioned fixedly in using place, a motor seat which fixes a motor united with air-extracting blades, and a housing shell for enclosure of the motor and air-extracting blades and union with the bottom plate. When a vehicle is parked under sunlight in hot day, the solar power-collecting plate provided on the roof top of the vehicle will automatically generate light-electricity effects to charge the storage battery of the vehicle and with the electricity power of which the air exhausting assembly will be activated to eliminate the heated internal air out of the vehicle, making the temperature inside equal to the outside.

3 Claims, 3 Drawing Sheets

VEHICULAR INTERNAL AIR EXHAUSTING DEVICE

FIELD OF THE INVENTION

The invention relates to a vehicular internal air exhausting device, particularly to a device when a vehicle is parked under sunshine which will eliminate the heated internal air out of the vehicle to substantially reduce the temperature inside to become equal to the outside to facilitate next use of the vehicle.

BACKGROUND OF THE INVENTION

At present, the vehicle number is always on a sharp increase and to meet demand parking lots are built at the same pace, of which most are out-of-doors. When a vehicle is parked entirely under direct sunshine, the temperature inside the closed vehicle body is surely to make a verticle rise and a few hours later the vehicle seat will becomes burningly hot to be unable to sit, and it is believed such experience nearly every vehicle user has had, especially in the tropical region. When time comes for the next use of the vehicle, the vehicle user usually needs to wide open the vehicle doors, turn on the air conditioner for cooling air, and wait for several minutes until the heated air is blown away and the seat temperature reduced somehow, before he can barely enough take the seat for driving to start. Indeed, it is really time-consuming and waste of power energy.

OBJECT OF THE INVENTION

The object of the invention is to solve the above mentioned problem by providing a vehicular internal air exhausting device which utilizes a solar power-collecting plate provided on the vehicle roof top to charge the storage battery of the vehicle and with the electricity power of which to activate the air exhausting assembly, mounted on the trunk compartment top plate or any other suitable position of the vehicle, to draw the heated internal air through an outlet to the trunk compartment or any other area to make elimination, so that the vehicle internal temperature reaches equal to the outside to facilitate next use of the vehicle.

Another object of conserving the power energy is thus achieved during use of the device and, furthermore, the vehicle internal will provide comfortable feelings immediately after the air conditioner is turned on.

SUMMARY OF THE INVENTION

The vehicular internal air exhausting device of the invention consists of an air exhausting assembly and a power source supply assembly. The air exhausting assembly is made up of bottom plate, motor seat, motor, air-extracting blades and housing shell, and is mounted on the trunk compartment top plate behind rear seat or any other suitable position of the vehicle. After activated, the air exhausting assembly will eliminate the heated internal air from the vehicle to make the temperature inside equal to the outside so as to have facilitation in the next use of the vehicle. The electricity power used by the air exhausting assembly comes from a set of storage battery which are charged by means of the solar power-collecting plate provided on the vehicle roof top and supplemented by means of a charging circuit.

SPECIFIC DESCRIPTION

Figure 1:
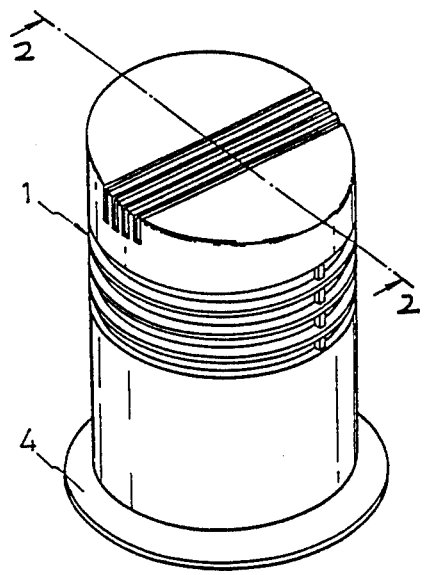
FIG. 1 is a perspective view of the preferred embodiment of the invention.
Figure 2:
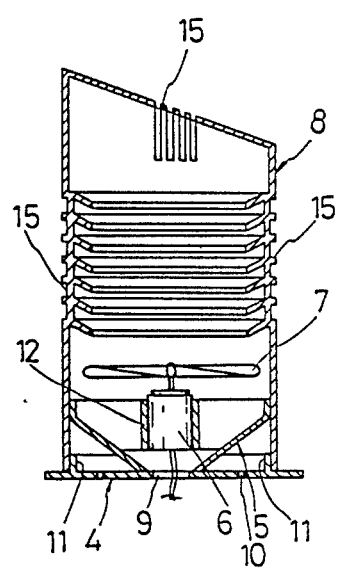
FIG. 2 is a sectional view taken along 2—2 line of FIG. 1.

Just as FIGS. 1-4 show, the invention comprises of air exhausting assembly 1 and power source supply assembly 2. Air exhausting 1, one or more than one, is mounted to the trunk compartment top plate (as FIG. 5 shows) or other suitable position of the vehicle 3 to extract the hot vehicular internal air downward to the trunk compartment internal to make elimination, comprising bottom plate 4, motor seat 5, motor 6, air-extracting blades 7, and housing shell 8. Bottom plate 4 in its center has an outlet 9 for the hot air to be sucked into the trunk compartment internal and near its periphery a plurality of screw holes 10 with which to be screwedly mounted to the trunk compartment top plate by screws, and an annular flange 11 provided of adaption to the inner diameter of housing shell 8 to be united together. Inside annular flange 11, there contains a motor seat 5 which is cone-formed and has a motor barrel 12 reserved in its center to accommodate motor 6 and has aerofoils 13 to bridge connection between motor barrel 12 and outer circle 14. Motor 6 is a small, direct-current motor combined with air-extracting blades 7 at its output shaft; when motor 6 is operated, the heated internal air of the vehicle will be drawn into the trunk compartment wherein elimination is made to maintain the internal temperature to be equal to the outside to facilitate the vehicle driver's next use of his car. Housing shell 8 joined with the outside of flange 11 has cylindric form where there are air intake cascades 15 provided in its periphery and top areas for the air around through air intake cascades 15 to be endlessly sucked into in a smooth way.

Figure 4:
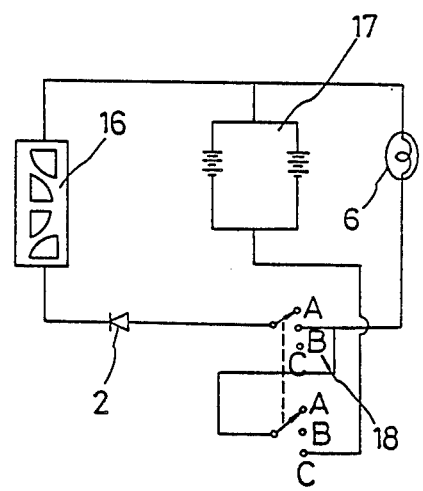
FIG. 4 is a diagram view for the power source supply of the invention.
Figure 3:
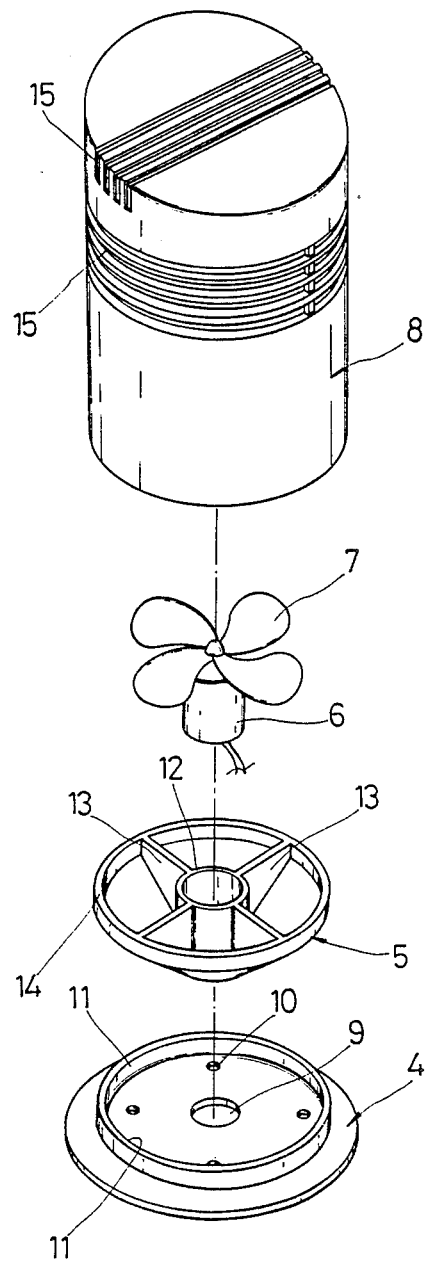
FIG. 3 is an exploded view for construction of FIG. 1.
Figure 5:
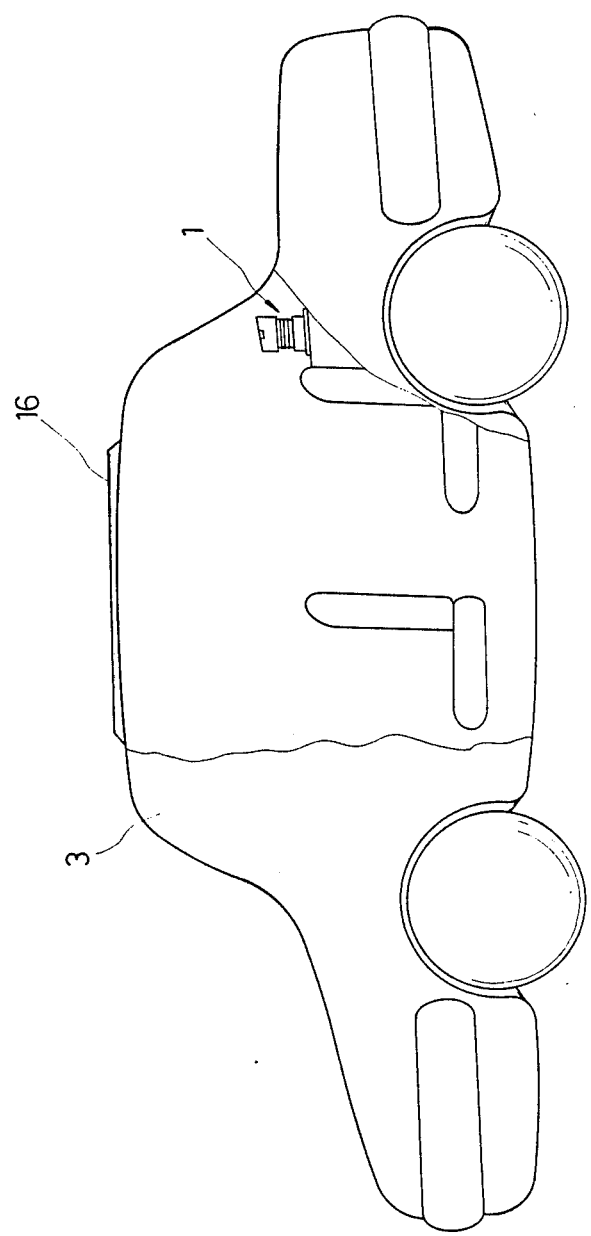
FIG. 5 is an example view of the installation of the inventive device on the trunk compartment behind rear seat of the vehicle.

As FIG. 4 shows, the power source supply assembly 2 is functional through a solar power-collecting plate located appropriately on the vehicle roof top that makes solar battery 16 come to be available to supply electricity, or optionally through supply by the original battery 17 of the vehicle under control by a set of switch 18. The designated A is for rechargeable battery 17 to be charged; B is for solar battery 16 to be used to supply electricity power to mobilize motor 6; C is for storage battery 17 to be used to supply the required electricity power for motor 6.

I claim:

1. A vehicular internal air exhausting device which comprises:

a power source supply assembly for supplying electricity power from a battery under control of a set of switches;

an air exhausting assembly mounted on a trunk compartment top plate behind a vehicle seat for extracting the vehicular internal heated air toward said trunk compartment, said exhaust assembly comprising: a bottom plate, a motor seat, a motor having an output shaft, an air-extracting blades, and a cylindrical housing shell having an inner diameter; said bottom plate having an outlet in its center for the extracted air which enters the trunk compartment, screw holes near said bottom plate periphery for mounting to the trunk compartment top plate, and said bottom plate having an annular flange inside of and adapted to said housing shell inner diameter for connecting said top plate to said housing shell; said housing shell, containing said motor seat which is cone-formed and has a motor barrel in its center to accommodate said motor and aerofoils provided to bridge connection between said motor barrel and an outer circle of said motor seat; said motor united with said air-extracting blades at its output shaft; said housing shell having air intake cascades in its periphery and top areas, said motor being electrically connected to said power source supply assembly;

wherein the vehicular internal temperature will become equal to the outside temperature.

2. The apparatus of claim 1 wherein said battery is a solar battery.

3. The apparatus of claim 1 wherein said battery is a vehicle storage battery.

* * * * *